United States Patent Office 3,734,892
Patented May 22, 1973

3,734,892
ESTERIFICATION OF TEREPHTHALIC ACID WITH AN ALKYLENE GLYCOL IN THE PRESENCE OF AN ALKALINE SALT OF A GLYCINE COMPOUND
Robert Alden Lofquist, Richmond, Va., assignor to Allied Chemical Corporation, New York, N.Y.
No Drawing. Continuation-in-part of application Ser. No. 883,355, Dec. 8, 1969. This application Sept. 30, 1971, Ser. No. 185,407
Int. Cl. C08g *17/13*
U.S. Cl. 260—75 R         20 Claims

ABSTRACT OF THE DISCLOSURE

The esterification of polycarboxylic acid with an alkylene glycol is described under conditions of direct esterification wherein the polycarboxylic acid is esterified with an alkylene glycol in the presence of a compound of the formula

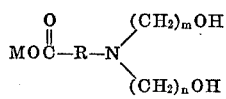

wherein

M is an alkaline metal selected from the group consisting of sodium and potassium, or a tertiary alkyl amine,
R is $CH_2$, and
$m$ and $n$ are whole numbers from 2 to 4 wherein the number can be equal or unequal one to the other.

BACKGROUND OF THE INVENTION

This is a continuation-in-part of application Ser. No. 883,355, filed Dec. 8, 1969 now abandoned.

This invention relates to a process for preparing linear polyesters. More particularly, it relates to an improved process for directly providing polyesters in the presence of an alkaline salt of a glycine compound which can then be polycondensed into high molecular weight and high quality linear polyesters or copolyester suitable for further processing into shaped articles, such as, fibers and films.

A process for the preparation of polyethylene terephthalate by the direct esterification of a polycarboxylic acid with an alkylene glycol is known but has not proved entirely satisfactory, partly because the product obtained is inferior for many end uses. Further, the prior known processes utilizing the direct esterification of a polycarboxylic acid with an alkylene glycol ether ester are often obtained that give highly unfavorable influence on the final quality of polymer because of the simultaneous formation of an ether bond. The process of the present invention substantially entirely eliminates the formation of these undesirable ether esters or decreases the formation of them to such an extent that they are of no major detrimental consequence to products made therefrom. Further, low free carboxyl groups are obtained in accordance with this process.

SUMMARY OF THE INVENTION

Therefore, it is a prime object of this invention to provide an improved process for the direct esterification of a polycarboxylic acid with an alkylene glycol. Another object of this invention is to provide an improved process for directly preparing polyesters having improved properties which can then be conveniently polycondensed into high molecular weight and high quality polyesters or copolyesters suitable for processing into shaped articles, such as, fibers, films, filaments, etc. as a continuous or discontinuous process. Another object of this invention is to provide an improved process for directly preparing polyesters in the presence of an alkaline salt of a glycine compound which yields improved properties to said esters which can then be conveniently polycondensed into high molecular weight and high quality polyesters or copolyesters suitable for processing into shaped articles, such as, fibers, filaments and films as a continuous or discontinuous process.

The above objects and other objects of this invention are accomplished in one instance in accordance with this invention in which the production of high molecular weight polyesters, particularly the esterification stage thereof is carried out under direct esterification conditions in the presence of a compound of the formula

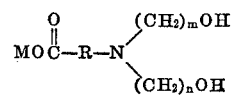

wherein

M is an alkaline metal selected from the group consisting of sodium and potassium, or a tertiary alkyl amine,
R is $CH_2$, and
$m$ and $n$ are whole numbers from 2 to 4 wherein the number can be equal or unequal one to the other in an amount sufficient to improve the physical properties of the resulting polyester.

The objects of this invention are accomplished in another instance in accordance with this invention in which the production of high molecular weight polyesters, particularly the esterification stage thereof is carried out under direct esterification conditions in the presence of a compound of the formula

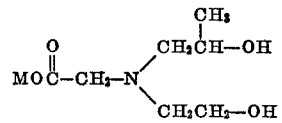

wherein M is an alkaline metal selected from the group consisting of sodium and potassium, or a tertiary alkyl amine in an amount sufficient to improve the physical properties of the resulting polyester.

Other objects of this invention are accomplished in another instance in accordance with this invention in which the production of high molecular weight polyesters, particularly the esterification stage thereof is carried out under direct esterification conditions in the presence of a compound of the formula

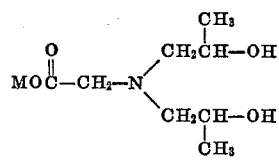

wherein M is an alkaline metal selected from the group consisting of sodium and potassium, or a tertiary alkyl amine in an amount sufficient to improve the physical properties of the resulting polyester.

The above objects and other objects of this invention are further accomplished in another instance in accordance with this invention in which the production of high molecular weight polyesters, particularly the esterification stage thereof is carried out under direct esterification conditions in the presence of a compound of the formula

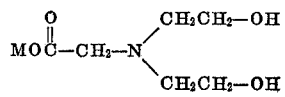

wherein M is an alkaline metal selected from the group consisting of sodium and potassium, or a tertiary alkyl amine in an amount sufficient to improve the physical properties of the resulting polyester.

In general, the direct esterification in accordance with this invention is carried out with the molecular ratio of the acid to the polyol of from about 1.0 to about 1.0 to 2.5 and preferably in a mole ratio of from about 1.0 to about 1.1 to 1.7. The process of this invention enables the use of an ethylene glycol, terephthalic acid ratio that is as close to unity as is practicable which avoids glycol wastes and thus shifts the economics of the process more to the favorable side.

The direct esterification of the polycarboxylic acid and the polyol may start at a temperature as low as 200° C. and range up to about 300° C. The reaction is carried out in the absence of an oxygen containing gas and may be carried out at atmospheric or at elevated pressure. The buffering amount of the alkaline salt of the glycine type compound present during the esterification reaction step ranges generally from about 0.01 to about 0.0001, and preferably from about 0.005 to about 0.0005 mole percent per mole of the acid. Any remaining glycol is distilled off after the direct esterification step is complete. A polycondensation catalyst may then be added, if not added prior to the esterification step. Such catalysts are, for example, the compounds of antimony, lead oxide, sodium alcoholate, lithium hydride, zinc acetate, and zinc acetylacetonate as well as others. They are generally utilized in small amounts, such as from about 0.005 to about 1.6% based on the weight of the reactants. The condensation or polymerization reaction is usually carried out at a reduced pressure which can be as low as 0.1 torr and a temperature of from about 260° C. to about 300° C. The condensation or polymerization reaction is carried out under these conditions for periods of 1.5 to about 10 hours, and preferably from about 2 to about 6 hours until a polymerized polyester product of the requisite molecular weight, as determined by viscosity or other convenient physical measurement is obtained. The duration of such periods depends upon many factors, such as the predetermined polymerization conditions of a batch or a continuous process, pressure and temperature profiles, surface generation conditions, catalyst concentration, ingredient mole ratios, etc. Continuous agitation, when the polymerization mass is a continuous process gives maximum exposure to the vaccum which further assists in removing any unreacted glycol and other by-products.

Various additives can be added with the polycarboxylic acid and polyol feed or during the direct esterification reaction in order to further control the reactions and tailor the characteristics or physical properties of the final polymer as required for specific end uses. For example, a small amount of diphenylene phenylene diamine can be added if fatigue resistance is desirable. Other well known additives can be used to enhance and/or control other characteristics of the finished polymer, such as, heat and light stability, static dissipation, flammability, dye affinity, luster, adhesion, etc. Other additives frequently used are dyestuff precursors and assistants, pigments, fluorescent agents, brighteners, non-reactive and heterogeneous polymers, etc. Additives for control of the reaction such as catalysts and chain terminators can also be added with the polycarboxylic acid-polyol feed or during the direct esterification.

DESCRIPTION OF THE PREFERRED EMBODIMENTS

The following examples, in which all parts are by weight unless otherwise specified, are given to further illustrate the invention.

Example 1

A mixture containing 19.2 grams of terephthalic acid (0.116 mole), 10.8 grams of ethylene glycol (0.174 mole), 0.0693 gram of antimony tristallate and 0.061 gram of a 41% aqueous solution of the sodium salt of dihydroxyethylglycine marketed by Dow Chemical Co. under the name Versene Fe-3 Specific were blended in a Waring Blender and then put into a stainless steel tube 8 inches long, 0.75 O.D., 0.065 wall thickness and capped on both ends by Swagelok caps. A second tube was filled with an identical mixture except for the absence of the sodium salt of dihydroxyethylglycine. The tubes were closed and placed in a salt bath at 270° C. After two hours the tubes were removed from the salt bath and opened. The contents were then analyzed for acid number (mg. of KOH per gram of sample) and for diethylene glycol content. The analytical results were as follows:

|  | Mg. KOH/ gm. sample | DEG/EG (wt. ratio) |
|---|---|---|
| (a) With sodium salt of dihydroxyethylglycerine | 228 | 0.077 |
| (b) Control | 313 | 0.165 |

Four other sealed tubes were prepared as above, two with the solution of the sodium salt of dihydroxyethylglycine and two without. One tube from each pair was held in a salt bath for one hour, and one tube of each pair was held in a salt bath for two hours. The analytical results were as follows:

|  | Mg. KOH/ gm. sample | DEG/EG (wt. ratio) |
|---|---|---|
| (a) With sodium salt of dihydroxyethylglycine—2 hours at 270° C | 113 | 0.142 |
| (b) Control—2 hours at 270° C | 297 | 0.280 |

Example 2

A mixture containing 4.22 grams of a 41% aqueous solution of the sodium salt of dihydroxyethylglycine, (0.0093 mole), 830 grams of terephthalic acid (5.0 moles) and 465 grams of ethylene glycol (7.5 moles) was charged to a one-gallon autoclave equipped with a nitrogen sparger and a distillation take-off. After sweeping out the reactor with nitrogen, the reactor was electrically heated to 270° C. internal wall temperature. The pressure was maintained at no more than 75 p.s.i.g. by a controlled bleeding of vapor through the distillation arm. A distillate of water-ethylene glycol was recovered. When bleeding off vapor was no longer required in order to keep the pressure below 75 p.s.i.g. (about two hours) the pressure was reduced to atmospheric. The prepolymer was then extruded out the bottom of the reactor. The prepolymer was analyzed for carboxyl end groups, diethylene glycol content and intrinsic viscosity, prepolymer mixed in phenol/tetrachloroethane (P/TCE). The analyses of the prepolymer in comparison with a control example not utilizing the teachings of this invention are as follows:

|  | COOH (meq./ kg.) | DEG/EG (wt. ratio) | Viscosity (P/TCE) |
|---|---|---|---|
| Prepolymer | 215 | 0.060 | 0.09 |
| Control, no glycine type compound | 205 | 0.088 | 0.1 |

The rate of water taken off during this reaction was 2.7 cc./min., as compared to the rate of water coming off the control example of 2.3 cc./min. during the pressure bleed stage. These prepolymers were polymerized further in a thin film evaporator at 280° C. under 0.1 mm. pressure for three hours. The analyses of the prepolymers were as follows:

|  | COOH (meq./ kg.) | DEG/EG (wt. ratio) | Viscosity (P/TCE) |
|---|---|---|---|
| Polymer | 24.0 | 0.055 | 0.69 |
| Control, no glycine type compound | 55.0 | 0.12 | 0.88 |

A second batch of prepolymer was made as in Example 1, except 2.11 grams (0.0046 mole), one held the amount used in Example 1, of the sodium salt of dihydroxyethylglycine was used. The analytical results were as follows:

|  | COOH (meq./kg.) | DEG/EG (wt. ratio) | Viscosity (P/TCE) |
|---|---|---|---|
| Prepolymer | 222 | 0.055 | 0.11 |

The rate of water generation during this reaction was 3.3 cc./min.

Example 3

Ten (10) grams (0.0614 mole) of dihydroxyethyl glycine were added to 19.5 cc. of distilled water containing 3.44 grams (0.0614 mole) of potassium hydroxide. Of the resulting 40% solution 0.06 gram was added to a mixture of 19.2 grams (0.116 mole) of terephthalic acid, 10.8 grams (0.174 mole), and 0.0693 gram of antimony tristallate.

This mixture was blended in a Waring Blender and then put into a stainless steel tube similar to the tube described in Example 1. A second tube was filled with an identical mixture except for the absence of the potassium salt of dihydroxyethyl glycine. The tubes were closed and heated in a fluidized sand bath to 270° C. After two hours, the tubes were removed, and opened. The analyses of the contents showed the following:

|  | Mg. KOH/gm. sample | DEG/EG (wt. ratio) |
|---|---|---|
| (a) With potassium salt of dihydroxyethyl glycine | 230 | 0.081 |
| (b) Control | 291 | 0.175 |

Example 4

Ten grams (0.0614 mole) of dihydroxyethyl glycine were added to 6.2 grams (0.0614 mole) of triethylamine in 23 cc. of water. Of the resulting 42% solution, 0.06 gram was added to a terephthalic acid-glycol-antimony tristallate mixture identical to the previous example. This mixture was blended in a Waring Blender and it and a control mixture identical to the control of the previous example were put in tubes and heated to 270° C. for two hours. The analyses of the contents were as follows:

|  | Mg. KOH/gm. sample | DEG/EG (wt. ratio) |
|---|---|---|
| (a) With triethylammonium dihydroxyethyl glycinate | 280 | 0.097 |
| (b) Control | 302 | 0.172 |

The following table sets forth conditions and analytical results of various reactions using the above-described ingredients and reactants as well as others and carried out substantially as described above.

cedure described by Pohl in Analytical Chemistry, volume 26, page 1614, October 1954, and is expressed in equivalents per million grams. The highly esterified prepolymers can be polycondensed to a polyester polymer of molecular weight sufficiently high so as to be useful in the preparation of fibers and film having especially low diethylene glycol and free carboxyl group content. The testing used to determine the above characteristics was carried out using conventional analytical procedures.

Many advantages are obtained through the use of this process. The buffering agents of this invention are reasonable in cost and can be used with conventional equipment and procedures in the preparation of the polymers, and produce an improved polymer that is highly useful in the preparation of shaped articles, such as fibers and films. And even though the alkaline metal of sodium has been exemplified, other alkaline metals such as lithium and potassium are equally applicable to this invention. This invention is applicable to continuous fibers, filaments as well as short length fibers and filaments. It is also applicable to film production of high quality. Further, it is advantageous and considered to be within the scope of this invention to use low ether and free carboxyl linear terephthalate polyester fibers of any appropriate length for reinforcing rubber articles where the advantages of improved resistance to loss of strength at high temperatures are desired.

This invention has also been illustrated particularly with respect to the use of terephthalic acid and ethylene glycol as reactants. Other acids and other polyols can also be utilized in the process of this invention. Other acids and anhydrides which can be utilized in the process of this invention includes phthalic acid, isophthalic acid, phthalic anhydride naphthalene dicarboxylic acid, p,p¹-diphenyl dicarboxylic acid, hexahydroterephthalic acid, succinic acid, adipic acid, sebacic acid, as well as substituted acids, such as 5-sulfoisophthalic acid as an example. Other polyols utilizable in accordance with this invention are the linear and alicyclic alkylene glycols having 2 to 10 carbon atoms per molecule. Such glycols include propylene glycol, butylene glycol, trimethylene glycol, tetramethylene glycol, decamethylene glycol, 1,4-cyclohexane dimethanol, 1,3-cyclobutane dimethanol and mixtures thereof. The more preferred glycols, however, are the low molecular weight glycols which contain 2 to about 4 carbon atoms since they produce highly polymerized esters having high melting points. Copolyesters, having specifically desired characteristics can also be prepared in accordance with this invention by reacting one or more of the aforedescribed acids with one or more of the aforedescribed glycols.

The present invention provides a significant contribution in the art of preparing high molecular weight linear terephthalate polyesters and copolyesters having low ether and free carboxyl groups suitable for use in the preparation of fibers, films and other shaped articles. It will be apparent that many different embodiments of this invention may be made without departing from the spirit and scope thereof, and therefore, it is not intended to be limited except as indicated in the appended claims.

What is claimed is:

1. A process for the preparation of stable high molecular weight film and fiber-forming polyesters which com-

TABLE I

| Additive | Esterification | | | | | |
|---|---|---|---|---|---|---|
|  | Prepolymer | | | Polymer | | |
|  | I.V. | COOH (meq./kg.) | DEG/EG (wt. ratio) | I.V. | COOH (meq./kg.) | DEG/EG (wt. ratio) |
| None | 0.10 | 328 | 0.74 | 0.88 | 55 | 0.12 |
| Dihydroxyethyl glycine, Na salt | 0.08 | 301 | 0.067 | 0.50 | 45 | 0.07 |
| Antimony tristallate | 0.11 | 179 | 0.132 | 0.93 | 35 | 0.13 |
| Dihydroxyethyl glycine, Na salt plus antimony tristallate | 0.09 | 215 | 0.060 | 0.82 | 23 | 0.60 |
| One-half the above amount of dihydroxyethyl glycine, Na salt plus antimony tristallate | 0.11 | 222 | 0.055 | 0.44 | 39 | 0.062 |
| Dihydroxyethyl glycine, triethyl ammonium salt | 0.09 | 283 | 0.069 | 0.53 | 32 | 0.072 |

The table illustrates that the alkaline salts of glycine type compounds with and without the use of antimony tristallate when used as esterification buffering agents produce polymers having improved properties, particularly low ether groups such as diethylene glycol and low free carboxyl group concentration in accordance with this invention. The term "free carboxyl group" includes both the un-ionized acid group, —COOH, and the ionized group, —COO—. The determination of the concentration of carboxyl groups is made in accordance with the proprises esterfying an aromatic dicarboxylic acid with an alkylene glycol containing 2 to 10 carbon atoms per molecule under direct esterification conditions in the presence of from about 0.01 to about 0.0001 mole percent based on the moles of the acid of a compound of the formula

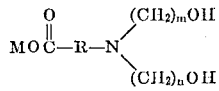

wherein
M is an alkaline metal selected from the group consisting of sodium and potassium, or a tertiary alkyl amine,
R is $CH_2$, and
$m$ and $n$ are whole numbers from 2 to 4 wherein the number can be equal or unequal one to the other; the molecular ratio of acid to glycol in said esterification being between 1.0:1.0 and 1.0:2.5, the temperature range being 200° C. to about 300° C., the pressure being at least atmospheric, the amount of condensation catalyst being 0.005 to 1.6 percent by weight based on the weight of the reactants, and said esterification being carried out in an inert atmosphere.

2. The process of claim 1 wherein the temperature of the direct esterification is maintained between about 200° C. and 300° C. and the pressure is maintained between about atmospheric and about 250 p.s.i.g.

3. The process of claim 1 wherein the aromatic dicarboxylic acid is selected from the group consisting of terephthalic acid, isophthalic acid and naphthalene dicarboxylic acid.

4. The process of claim 1 wherein the alkylene glycol is ethylene glycol.

5. The process of claim 1 wherein the aromatic dicarboxylic acid is terephthalic acid, the alkylene glvcol is ethylene glycol and the glycine compound is selected from the group consisting of the sodium or potassium salt of N,N-diethoxyglycine, dihydroxyethyl glycine, the sodium or potassium salt of dihydroxyethyl glycine, triethyl ammonium salt and triethyl ammonium dihydroxyethyl glycinate.

6. A process for the preparation of stable high molecular weight film and fiber forming polyesters which comprises esterifying an aromatic dicarboxylic acid with an alkylene glycol containing 2 to 10 carbon atoms per molecule under direct esterification conditions in the presence of from about 0.01 to about 0.0001 mole percent based on the moles of the acid of a compound of the formula

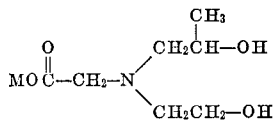

wherein M is an alkaline metal selected from the group consisting of sodium and potassium, or a tertiary alkyl amine; the molecular ratio of acid to glycol in said esterification being between 1.0:1.0 and 1.0:2.5, the temperature range being 200° C. to about 300° C., the pressure being at least atmospheric, the amount of condensation catalyst being 0.005 to 1.6 percent by weight based on the weight of the reactants, and said esterification being carried out in an inert atmosphere.

7. The process of claim 6 wherein the temperature of the direct esterification is maintained between about 200° C. and 300° C. and the pressure is maintained between about atmospheric and about 250 p.s.i.g.

8. The process of claim 6 wherein the aromatic dicarboxylic acid is selected from the group consisting of terephthalic acid, isophthalic acid and naphthalene dicarboxylic acid.

9. The process of claim 6 wherein the alkylene glycol is ethylene glycol.

10. The process of claim 6 wherein the aromatic dicarboxylic acid is terephthalic acid, the alkylene glycol is ethylene glycol and the glycine compound is selected from the group consisting of the sodium or potassium salt of N,N-diethoxyglycine, dihydroxyethyl glycine, the sodium or potassium salt of dihydroxyethyl glycine, triethyl ammonium salt and triethyl ammonium dihydroxyethyl glycinate.

11. A process for the preparation of stable high molecular weight film and fiber forming polyesters which comprises esterifying an aromatic dicarboxylic acid with an alkylene glycol containing 2 to 10 carbon atoms per molecule under direct esterification conditions in the presence of from about 0.01 to about 0.0001 mole percent based on the moles of the acid of a compound of the formula

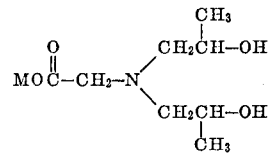

wherein M is an alkaline metal selected from the group consisting of sodium and potassium, or a tertiary alkyl amine; the molecular ratio of acid to glycol in said esterification being between 1.0:1.0 and 1.0:2.5, the temperature range being 200° C. to about 300° C., the pressure being at least atmospheric, the amount of condensation catalyst being 0.005 to 1.6 percent by weight based on the weight of the reactants, and said esterification being carried out in an inert atmosphere.

12. The process of claim 11 wherein the temperature of the direct esterification is maintained between about 200° C. and 300° C. and the pressure is maintained between about atmospheric and about 250 p.s.i.g.

13. The process of claim 11 wherein the aromatic dicarboxylic acid is selected from the group consisting of terephthalic acid, isophthalic acid and naphthalene dicarboxylic acid.

14. The process of claim 11 wherein the alkylene glycol is ethylene glycol.

15. The process of claim 11 wherein the aromatic dicarboxylic acid is terephthalic acid, the alkylene glycol is ethylene glycol and the glycine compound is selected from the group consisting of the sodium or potassium salt of N,N-diethoxyglycine, dihydroxyethyl glycine, the sodium or potassium salt of dihydroxyethyl glycine, triethyl ammonium salt and triethyl ammonium dihydroxyethyl glycinate.

16. A process for the preparation of stable high molecular weight film and fiber forming polyesters which comprises esterifying an aromatic dicarboxylic acid with an alkylene glycol containing 2 to 10 carbon atoms per molecule under direct esterification conditions in the presence of from about 0.01 to about 0.0001 mole percent based on the moles of the acid of a compound of the formula

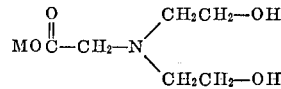

wherein M is an alkaline metal selected from the group consisting of sodium and potassium, or a tertiary alkyl amine; the molecular ratio of acid to glycol in said esterification being between about 1.0:1.0 and 1.0:2.5, the temperature range being 200° C. to about 300° C., the pressure being at least atmospheric, the amount of condensation catalyst being 0.005 to 1.6 percent by weight based on the weight of the reactants, and said esterification being carried out in an inert atmosphere.

17. The process of claim 16 wherein the temperature of the direct esterification is maintained between about 200° C. and 300° C. and the pressure is maintained between about atmospheric and about 250 p.s.i.g.

18. The process of claim 16 wherein the aromatic dicarboxylic acid is selected from the group consisting of terephthalic acid, isophthalic acid and naphthalene dicarboxylic acid.

19. The process of claim 16 wherein the alkylene glycol is ethylene glycol.

20. The process of claim 16 wherein the aromatic dicarboxylic acid is terephthalic acid, the alkylene glycol is ethylene glycol and the glycine compound is selected from the group consisting of the sodium or potassium salt of N,N-diethoxyglycine, dihydroxyethyl glycine, the sodium or potassium salt of dihydroxyethyl glycine, triethyl ammonium salt and triethyl ammonium dihydroxyethyl glycinate.

References Cited
UNITED STATES PATENTS 2,831,831  4/1958  Caldwell et al.

MELVIN GOLDSTEIN, Primary Examiner

U.S. Cl. X.R.

260—75 N